(12) United States Patent
Norris (10) Patent No.: US 8,707,747 B1
(45) Date of Patent: Apr. 29, 2014

(54) FORMING A SHAPED SANDWICH PANEL WITH A DIE AND A PRESSURE VESSEL

(71) Applicant: Rohr, Inc., San Diego, CA (US)

(72) Inventor: Brian Norris, San Diego, CA (US)

(73) Assignee: Rohr, Inc., San Diego, CA (US)

( * ) Notice: Subject to any disclaimer, the term of this patent is extended or adjusted under 35 U.S.C. 154(b) by 0 days.

(21) Appl. No.: 13/715,318

(22) Filed: Dec. 14, 2012

(51) Int. Cl.
E04B 1/92 (2006.01)
B23B 37/00 (2006.01)

(52) U.S. Cl.
USPC .................. 72/60; 72/56; 228/157; 228/181; 228/193; 428/116

(58) Field of Classification Search
USPC ............. 156/60, 391; 428/116; 228/175, 181, 228/193, 194, 195; 72/56, 60
See application file for complete search history.

(56) References Cited

U.S. PATENT DOCUMENTS

| | | | | |
|---|---|---|---|---|
| 3,073,268 | A * | 1/1963 | Cole | 228/42 |
| 3,091,846 | A * | 6/1963 | Henry | 228/181 |
| 3,196,533 | A * | 7/1965 | Ida et al. | 29/421.2 |
| 3,373,480 | A * | 3/1968 | Fuchs, Jr. | 228/157 |
| 3,478,553 | A * | 11/1969 | Weglarz | 72/46 |
| 3,501,367 | A | 3/1970 | Parker | |
| 3,922,899 | A * | 12/1975 | Fremont et al. | 72/128 |
| 4,059,217 | A | 11/1977 | Woodward | |
| 4,336,292 | A | 6/1982 | Blair | |
| 4,522,859 | A | 6/1985 | Blair | |
| 4,715,525 | A | 12/1987 | Norris | |
| 4,850,093 | A * | 7/1989 | Parente | 29/428 |
| 4,869,421 | A | 9/1989 | Norris et al. | |
| 5,013,613 | A | 5/1991 | Gojny et al. | |
| 5,046,345 | A * | 9/1991 | Zieve | 72/56 |
| 5,116,689 | A | 5/1992 | Castro et al. | |
| 5,199,631 | A * | 4/1993 | Anderson et al. | 228/181 |
| 6,475,637 | B1 | 11/2002 | Strutt et al. | |
| 6,720,086 | B1 | 4/2004 | Strutt | |
| 6,827,180 | B2 | 12/2004 | Wilson | |
| 7,866,535 | B2 * | 1/2011 | Eilert et al. | 228/181 |
| 8,474,684 | B2 * | 7/2013 | Sommer et al. | 228/193 |
| 2009/0199946 | A1 | 8/2009 | Sommer et al. | |

FOREIGN PATENT DOCUMENTS

DE 102006052696 5/2008
GB 2263081 7/1993

OTHER PUBLICATIONS

EP search report for EP13193610.6 dated Mar. 4, 2014.

* cited by examiner

Primary Examiner — David B Jones
(74) Attorney, Agent, or Firm — O'Shea Getz P.C.

(57) ABSTRACT

A process for manufacturing a shaped sandwich panel includes arranging a sandwich panel adjacent a die. The sandwich panel includes a core layer arranged between and connected to a first layer and a second layer. The core layer includes a plurality of apertures that extend through the core layer to the first layer. The first layer engages the die. Fluid within the apertures is pressurized to a pressure adequate to at least partially form the sandwich panel to a geometry of the die.

11 Claims, 6 Drawing Sheets

FORMING A SHAPED SANDWICH PANEL WITH A DIE AND A PRESSURE VESSEL

BACKGROUND OF THE INVENTION

1. Technical Field

This disclosure relates generally to manufacturing a sandwich panel and, more particularly, to a forming a shaped sandwich panel with a die.

2. Background Information

A turbine engine may include a sandwich panel such as a high temperature, noise attenuation panel to reduce noise emitted during turbine engine operation and/or to reduce engine weight. The sandwich panel may be manufactured by bonding together layered metallic materials using a differential pressure bonding process, dead weight or tooling utilizing differing coefficients of expansion. The layered metallic materials may include a metal honeycomb core (e.g., open cell core) arranged between opposing metal skins (e.g., face sheets).

According to known bonding processes, a pressure differential may be applied across the layered metallic materials to simultaneously compress and bond the materials together at an elevated temperature. The layered metallic materials, for example, may be compressed between an inflatable pressure vessel and a support, and heated within a process chamber. The process chamber may be a vacuum furnace or an inert gas furnace. Bonding material is typically arranged between adjacent layers of the metallic materials, which material bonds the layers together; e.g., by liquid interface diffusion or brazing.

Subsequent to the bonding process, the sandwich panel may be shaped to have a simple or complex curved geometry; e.g., a cylindrical, conical, spherical or compound curved geometry. According to known techniques, the panel may be shaped by pressing the panel against a die with an inflatable pressure vessel, thereby causing the panel to assume the shape of the die. Such a formation technique can, however, crush or otherwise deform the honeycomb core portion of the panel, particularly when the adopted panel shape requires significant deformation.

There is a need in the art for an improved process for manufacturing a sandwich panel.

SUMMARY OF THE DISCLOSURE

According to an aspect of the invention, a process is provided for manufacturing a shaped sandwich panel. The process includes arranging a sandwich panel adjacent a die. The sandwich panel includes a core layer arranged between and connected to a first layer and a second layer. The core layer includes a plurality of apertures that extend through the core layer to the first layer. The first layer engages the die. Fluid within the apertures is pressurized to a pressure adequate to at least partially form the sandwich panel to a geometry of the die.

According to another aspect of the invention, another process is provided for manufacturing a shaped sandwich panel. The process includes arranging a sandwich panel adjacent a die. The sandwich panel includes a core layer arranged between and connected to a first layer and a second layer. The core layer includes a plurality of apertures that extend through the core layer to the first layer. The first layer is forced against the die from within the apertures to form the sandwich panel to a geometry of the die.

According to still another aspect of the invention, another process is provided for manufacturing a shaped sandwich panel. The process includes arranging a substantially planar sandwich panel adjacent the die. The sandwich panel has a plurality of layers including a first layer connected to a core layer. The first layer engages the die, and the core layer includes a plurality of apertures that extend through the core layer to the first layer. Fluid within the apertures is pressurized to a pressure adequate to at least partially form the sandwich panel to a geometry of the die, where at least a portion of the geometry is non-planar.

The first layer may be a solid layer. The second layer may be a perforated layer that allows pressurizing fluid to enter the sandwich panel, which then pushes the first layer to the desired shape. The first layer thereby may pull the core layer and second layer without overly deforming the core.

The pressurized fluid within the apertures may force the first layer against the die.

The fluid may be or include an inert fluid such as an inert gas.

The process may include connecting a pressure vessel panel to the first layer to form a pressure vessel in which the core layer and/or the second layer are located. The pressurizing of the fluid may include pressurizing the fluid within the pressure vessel.

The process may include directing the fluid through perforations in the second layer into the aperture. The process may also or alternatively include directing the fluid through perforations in the core layer into the apertures.

The process may include stacking the core layer between the first and the second layers. The process may also include diffusion bonding or brazing or liquid interface diffusion bonding the stacked layers together to provide the sandwich panel.

The process may include heating the sandwich panel. The pressurizing of the fluid may at least partially form the heated sandwich panel to the geometry of the die.

The first layer may be or include a sheet of material. The second layer may be or include a sheet of material. The core layer may have a honeycomb configuration or an open cell foam configuration. The layers of the sandwich panel may be constructed from metal and/or diffusion bonded together.

At least a portion of the geometry of the die may be arcuate or otherwise non-planar.

The first layer may engage the die. The forcing of the first layer against the die may include pressurizing fluid within the apertures.

The foregoing features and the operation of the invention will become more apparent in light of the following description and the accompanying drawings.

DETAILED DESCRIPTION OF THE INVENTION

Figure 1:
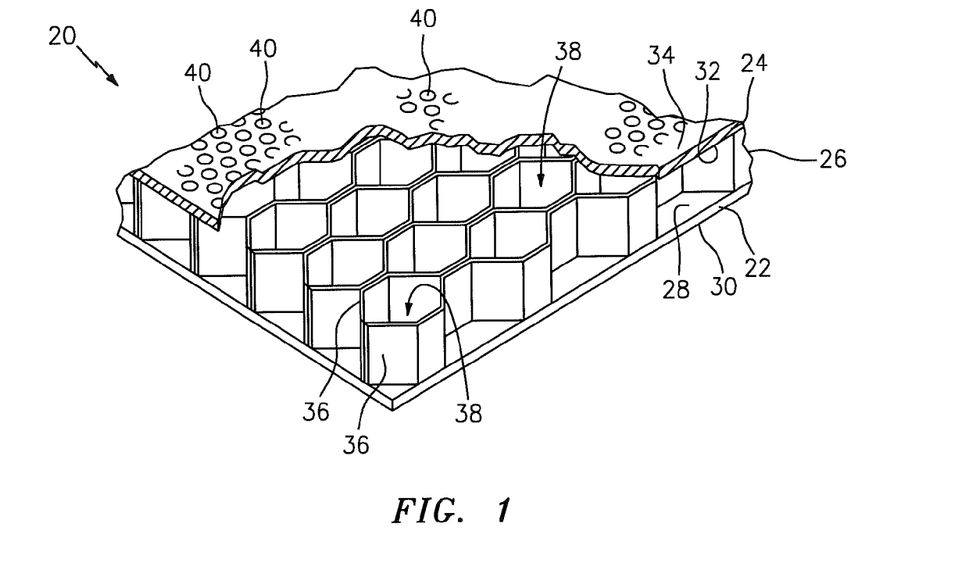
FIG. 1 is a perspective cutaway illustration of a portion of a sandwich panel.

FIG. 1 is a diagrammatic cutaway illustration of a portion of a sandwich panel 20 that may be used, for example as a noise attenuation panel within a high temperature environment of a gas turbine engine. The sandwich panel 20 includes a solid first layer 22, a second layer 24 (which may be perforated), and a hollow core layer 26. These layers 22, 24 and 26 may be constructed from aerospace materials such as titanium, titanium alloy, and nickel alloy (e.g., Inconel® alloy, etc.). The sandwich panel is not limited to any particular material, or materials, however.

The first layer 22 forms a first skin (e.g., face sheet) of the sandwich panel 20. The first layer 22 is configured from a non-perforated sheet of material (e.g., non-perforated sheet metal), and has a thickness that extends between an inner side surface 28 and an outer side surface 30.

Figure 2:
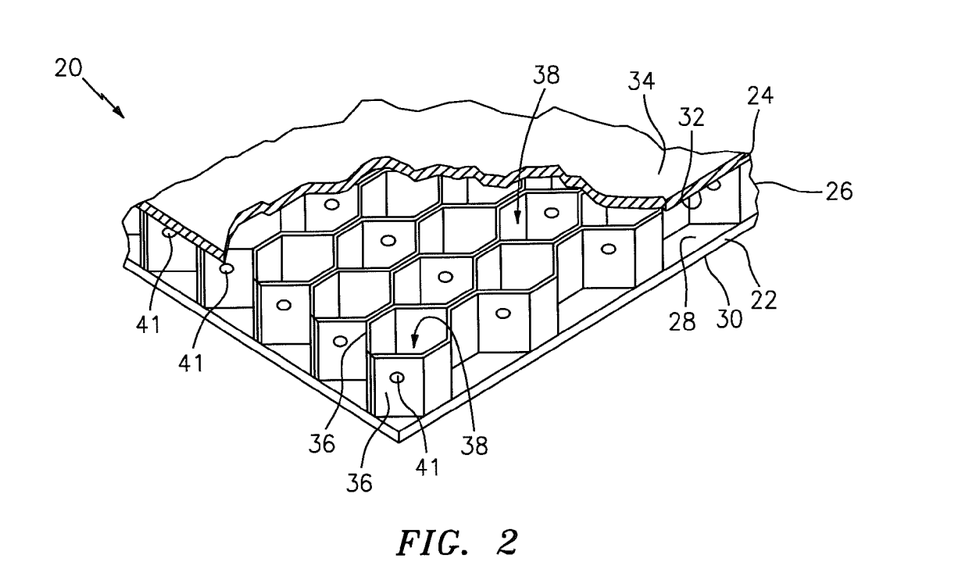
FIG. 2 is a perspective cutaway illustration of a portion of another sandwich panel.

The second layer 24 forms a second skin (e.g., face sheet) of the sandwich panel 20. The second layer 24 is configured from a perforated sheet of material (e.g., perforated sheet metal), and has a thickness that extends between an inner side surface 32 and an outer side surface 34. Alternatively, the second layer 24 may be configured from a non-perforated sheet of material as illustrated in FIG. 2, for example, where the core is vented.

The core layer 26 is arranged between and connected (e.g., diffusion bonded, brazed or liquid interface diffusion bonded) to the inner side surfaces 28 and 32 of the first and the second layers 22 and 24. The core layer 26 may have a honeycomb configuration with a plurality of open cells. The core layer 26 embodiment of FIG. 1, for example, includes a plurality of corrugated walls 36 that form a plurality of apertures 38 with polygonal (e.g., hexagonal) cross-sectional geometries. One or more of these apertures 38 extend through the core layer 26 between the inner side surfaces 28 and 32 of the first layer 22 and the second layer 24. In addition, one or more of the apertures 38 are vented to an environment surrounding the layers 24 and/or 26. For example, the second layer 24 may include perforations 40 that fluidly couple the apertures 38 to the surrounding environment. Alternatively, referring to FIG. 2, the corrugated walls 36 may include perforations 41 that fluidly couple the apertures 38 together as well as fluidly couple the apertures 38 to the surrounding environment.

Figure 3:
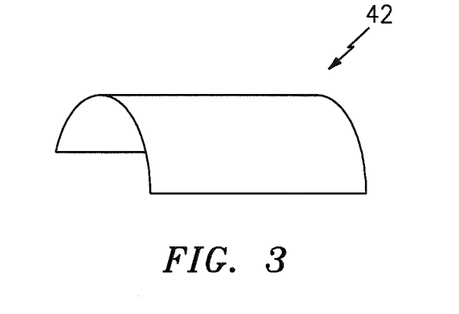
FIG. 3 is perspective diagrammatic illustration of a portion of a shaped sandwich panel.
Figure 4:
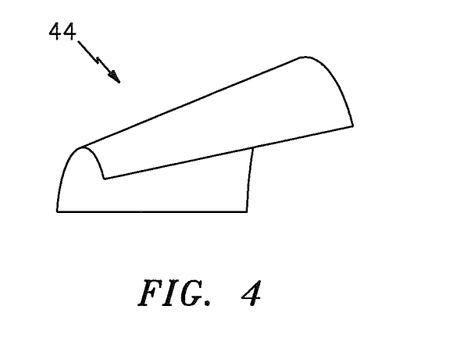
FIG. 4 is perspective diagrammatic illustration of a portion of another shaped sandwich panel.
Figure 5:
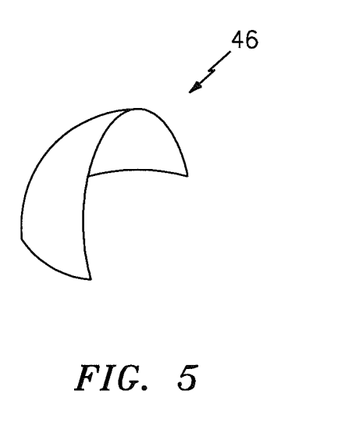
FIG. 5 is perspective diagrammatic illustration of a portion of another shaped sandwich panel.
Figure 6:
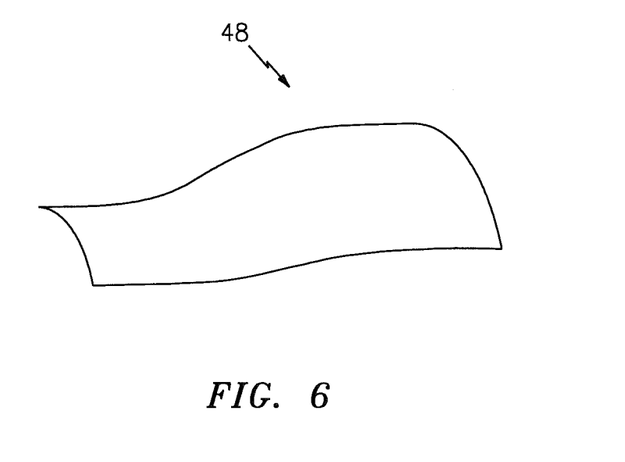
FIG. 6 is perspective diagrammatic illustration of a portion of another shaped sandwich panel.

The sandwich panel 20 may be configured as a shaped sandwich panel that includes one or more non-planar features; e.g., portions of the panel with simple and/or complex curved geometries. For example, FIG. 3 illustrates a portion of a shaped sandwich panel 42 with a semi-cylindrical geometry. FIG. 4 illustrates a portion of a shaped sandwich panel 44 with a semi-conical geometry. FIG. 5 illustrates a portion of a shaped sandwich panel 46 with a semi-spherical geometry. FIG. 6 illustrates a portion of a shaped sandwich panel 48 with an arcuate geometry. The term "arcuate" is used here to describe a curvature that may include one or portions with a non-linear planar geometry (e.g., a surface geometry that has a varying curvature that includes both concave and convex portions, etc.) or combinations of linear planar portions and arcuate portions. The shape of the sandwich panel, however, is not limited to any particular shape. In some embodiments, for example, the sandwich panel may include angled bends with curved corners.

The shaped sandwich panel may have various configurations and/or may be constructed from various materials other than those described above and illustrated in the drawings. One or more of the apertures in the core layer 26 and/or in the layers 22, for example, may have circular or non-circular (e.g., elliptical) cross-sectional geometries. The core layer may have a porous, non-honeycomb configuration such as an open cell foam configuration. One or more of the layers may be constructed from various metals other than titanium or nickel, or from various non-metals. The present invention therefore is not limited to any particular sandwich panel materials and/or configurations.

Figure 7:
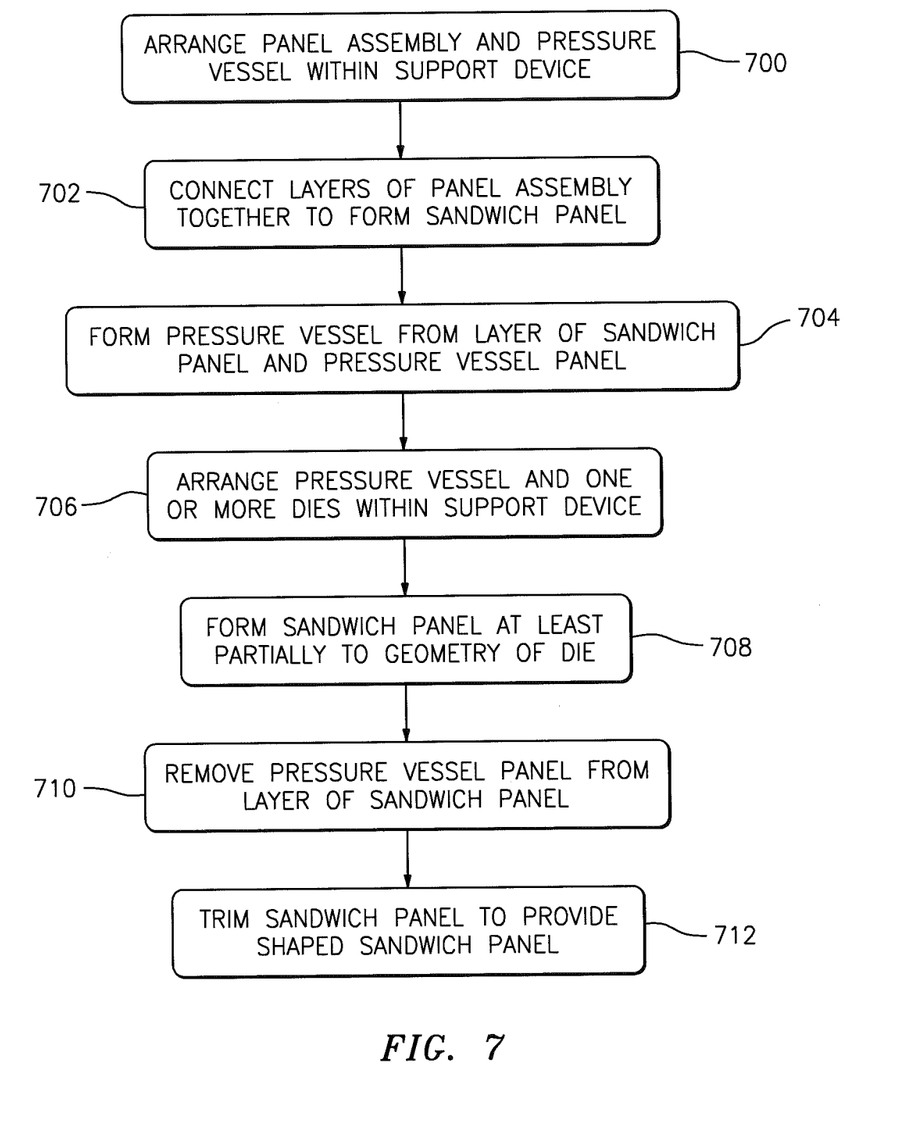
FIG. 7 is a flow diagram of a process for manufacturing a shaped sandwich panel.
Figure 8:
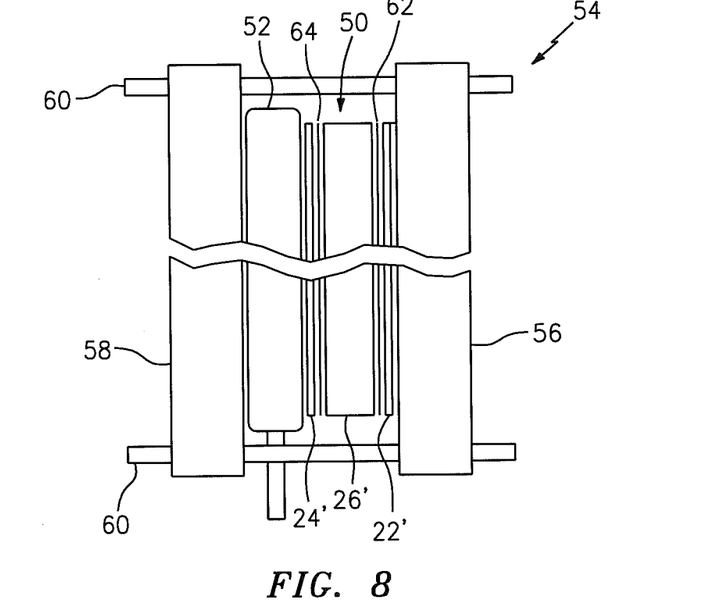
FIG. 8 is a diagrammatic illustration of a panel assembly and a pressure vessel arranged within a support device.

FIG. 7 is a flow diagram of a process for manufacturing a shaped sandwich panel. Referring to FIGS. 7 and 8, in step 700, a panel assembly 50 and an inflatable pressure vessel 52 are arranged in a support device 54. The support device 54 includes a first support 56 and a second support 58, which are connected together with a plurality of adjustable restraining rods 60. The panel assembly 50 includes a first layer 22', a sheet of bonding material 62, a core layer 26', another sheet of bonding material 64 and a second layer 24', which are sequentially stacked between the first support 56 and the pressure vessel 52. The pressure vessel 52 (e.g., a pressure bag) is arranged between the second support 58 and the second layer 24'.

Figure 9:
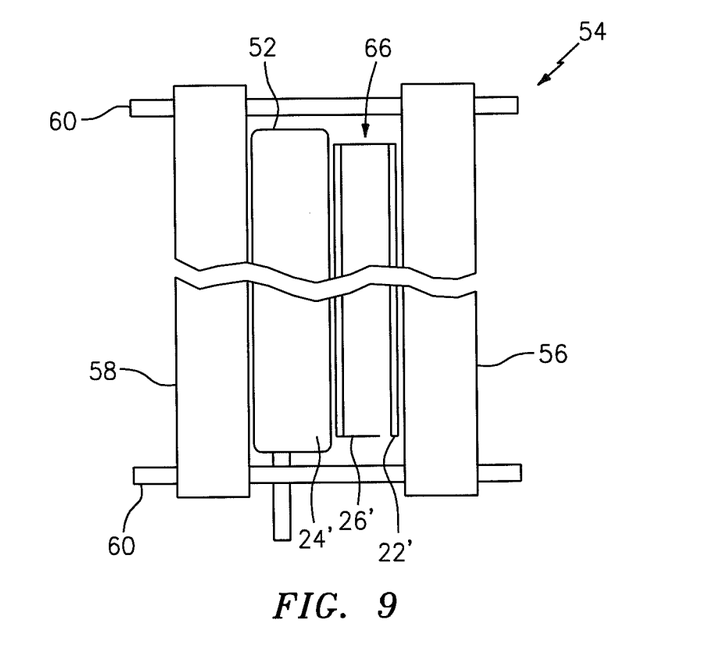
FIG. 9 is a diagrammatic illustration of a sandwich panel and a pressure vessel arranged within a support device.

Referring to FIGS. 7 and 9, in bonding step 702, the stacked layers 22', 24' and 26' of the panel assembly 50 are connected together to form a substantially planar sandwich panel 66. The stacked layers 22', 24' and 26', for example, are heated to a bonding temperature between about 910 and about 950 degrees Celsius. The pressure vessel 52 is concurrently or subsequently inflated to a bonding pressure between about 1400 and about 3500 Pascal (Pa), which clamps the stacked layers 22', 24' and 26' together between the pressure vessel 52 and the first support 56. These time and temperature profiles are typical for titanium alloys. Nickel or iron based alloys, however, may utilize greater bonding temperatures whereas aluminum based alloys may utilize lower bonding temperatures. The bonding pressures may be higher for nickel or iron based alloys than set forth above. The clamping of the heated layers 22', 24' and 26' may cause the bonding material 62 and 64 (see FIG. 8) to bond the layers together by way of liquid interface diffusion bonding. Once the layers 22', 24' and 26' are bonded together, the sandwich panel 66 is removed from the support device 54.

The stacked layers may alternatively be connected together during the step 702 using techniques other than diffusion bonding. The stacked layers, for example, may be welded, brazed or otherwise adhered together. The manufacturing process therefore is not limited to any particular layer connection techniques. Multiple panels may also be fabricated at once by stacking them vertically together in order to improve productivity.

Figure 10:
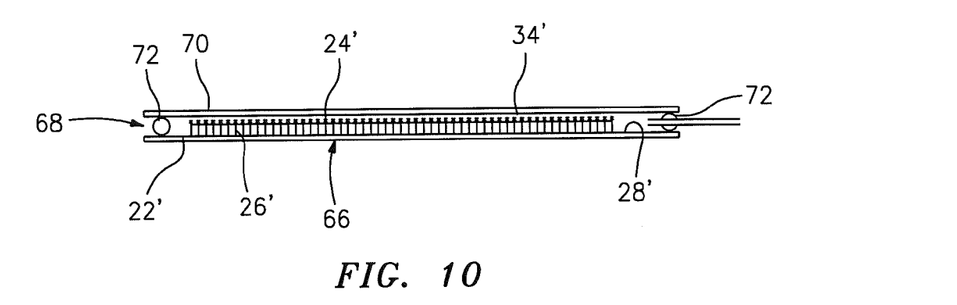
FIG. 10 is a diagrammatic illustration of a pressure vessel formed from a sandwich panel and a pressure vessel panel.

Referring to FIGS. 7 and 10, in step 704, a pressure vessel 68 is formed from the first layer 22' of the sandwich panel 66 and a pressure vessel panel 70. The pressure vessel panel 70, for example, is arranged adjacent the outer side 34'. The pressure vessel panel 70 is subsequently connected to a periphery of the inner side 28' with a seal 72 (e.g., beading).

The core layer 26' and the second layer 24' therefore are located within the pressure vessel 68.

Figure 11:
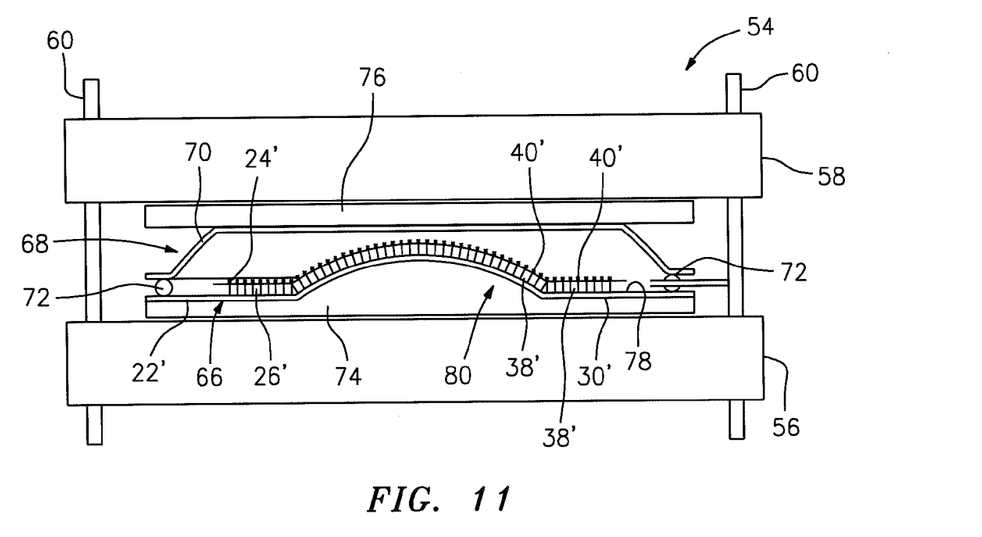
FIG. 11 is a diagrammatic illustration of the pressure vessel of FIG. 10 and a plurality of dies arranged within a support device.

Referring to FIGS. 7 and 11, in step 706, the pressure vessel 68 and one or more dies 74 and 76 are arranged within a support device. This support device may be the same support device 54 used in the steps 700 and 702 as illustrated in FIG. 11, or alternatively a separate device which, for example, incorporates the dies into the supports. The first die 74 engages the first support 56, and includes a die surface 78 with a geometry that can include at least one non-planar feature 80; e.g., a portion of the die surface 78 that forms a protrusion (or a recess). The second die 76 engages the second support 58. The sandwich panel 66 is arranged adjacent the first die 74, and the outer surface 30' engages (e.g., contacts) the die surface 78. The pressure vessel panel 70 is arranged between the sandwich panel 66 and the second die 76.

In forming step 708, the sandwich panel 66 is at least partially formed to the geometry of the die surface 78. The layers 22', 24' and 26', for example, are heated to a forming temperature between about 840 and about 960 degrees Celsius. The pressure vessel 68 is concurrently or subsequently inflated to a forming pressure between about 70 and about 1000 KPa with fluid; e.g., an inert fluid such as Argon gas. For nickel or iron based alloys the forming temperature may be higher whereas for lower melting point alloys such as aluminum alloys, the forming temperature may be lower. The term "inert fluid" is used to describe a fluid that is non-reactive with the material of the panel 66 and/or the pressure vessel panel 70. For many applications, an inert gas will work well as the inert fluid and will be easy to use. As the pressure vessel 68 is pressurized, the perforations 40' direct the fluid into the apertures 38'. The pressurized fluid within the apertures 38' and/or surrounding the periphery of the core layer 26' pushes the first layer 22' against the die surface 78. Concurrently, the first layer 22' pulls the core layer 26' and the second layer 24' towards the die surface 78. In this manner, the pressurized fluid at least partially forms the sandwich panel 66 to the geometry of the die surface 78. The sandwich panel 66 therefore may be shaped without moving the dies 74 and 76 and/or the supports 56 and 58 together; e.g., the dies 74 and 76 and/or the supports 56 and 58 may remain substantially stationary during the forming step 708. Once the sandwich panel 66 is shaped, the inert fluid is removed and the panel is removed from the support device 54.

Figure 12:
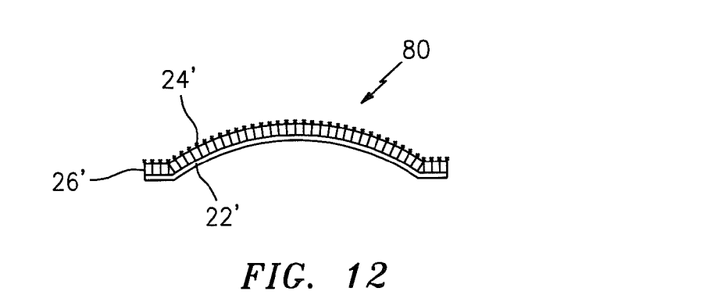
FIG. 12 is a diagrammatic illustration of a shaped sandwich panel.

Referring to FIGS. 7 and 12, in step 710, the pressure vessel panel 70 may be removed (e.g., cut) from the first layer 22'. In step 712, the first layer 22' and/or the entire sandwich panel may be trimmed to provide the shaped sandwich panel 80.

The foregoing bonding and forming temperatures and the foregoing bonding and forming pressures are provided for manufacturing a shaped sandwich panel constructed from titanium or nickel alloy. One or more of these temperatures and/or pressures, however, may be varied for alternative embodiments of the manufacturing process; e.g., for manufacturing a shaped sandwich panel constructed from other materials than titanium or nickel alloy. The manufacturing process therefore is not limited to any particular temperatures and/or pressures.

In some embodiments, the bonding step 702 and the forming step 708 may be performed in a common process chamber (e.g., furnace). In this manner, the layers of the sandwich panel may be heated to and substantially sustained at a common temperature. The layers of the sandwich panel therefore may not need to be reheated during the forming step 708, which may reduce the time and expense of the manufacturing process. Alternatively, the sandwich panel may be allowed to partially cool or cool to ambient before beginning the forming step 708.

Figure 13:
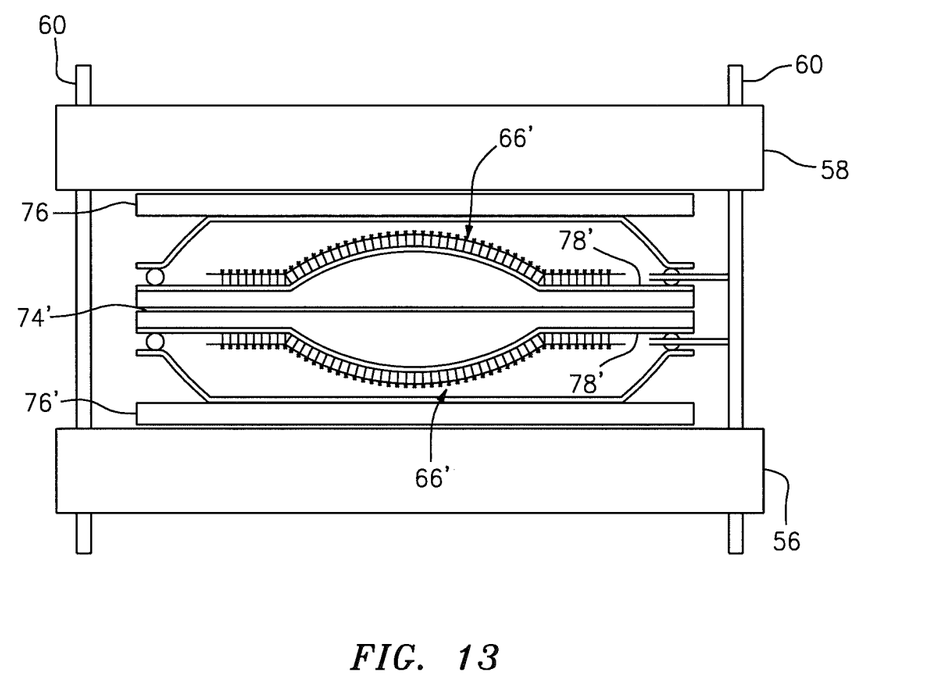
FIG. 13 is a diagrammatic illustration of a plurality of pressure vessels and a plurality of dies arranged within a support device.

In some embodiments, the foregoing process may be used to concurrently manufacture a plurality of shaped sandwich panels. Referring to FIG. 13, for example, a plurality of sandwich panels 66' may concurrently be formed against opposing die surfaces 78' of the first die 74'.

A shaped sandwich panel as described above may be included in various components of a turbine engine. An engine nacelle and an exhaust nozzle center plug, for example, may each include one or more shaped sandwich panels. A person of skill in the art, however, will recognize such shaped sandwich panels may also be utilized in non-turbine engine applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A process for manufacturing a shaped sandwich panel, comprising:
   arranging a sandwich panel adjacent a die, wherein the sandwich panel includes a core layer arranged between and connected to a first layer and a second layer, the core layer includes a plurality of apertures that extend through the core layer to the first layer, and the first layer engages the die;
   heating the sandwich panel; and
   pressurizing fluid within the apertures to a pressure adequate to at least partially form the heated sandwich panel to a geometry of the die.

2. The process of claim 1, wherein the pressurized fluid within the apertures forces the first layer against the die.

3. The process of claim 1, wherein the fluid comprises an inert fluid.

4. The process of claim 1, further comprising directing the fluid through perforations in the second layer into the apertures.

5. The process of claim 1, further comprising:
   stacking the core layer between the first and the second layers; and
   one of diffusion bonding, brazing and liquid interface diffusion bonding the stacked layers together to provide the sandwich panel.

6. The process of claim 1, wherein
   the first layer comprises a sheet of material;
   the second layer comprises a sheet of material; and
   the core layer has a honeycomb configuration.

7. The process of claim 6, wherein the layers of the sandwich panel are constructed from metal and one of diffusion bonded, brazed and liquid interface diffusion bonded together.

8. The process of claim 1, wherein at least a portion of the geometry of the die is arcuate.

9. A process for manufacturing a shaped sandwich panel, comprising:
   arranging a sandwich panel adjacent a die, wherein the sandwich panel includes a core layer arranged between and connected to a first layer and a second layer, the core layer includes a plurality of apertures that extend through the core layer to the first layer, and the first layer engages the die; and pressurizing fluid within the apertures to a pressure adequate to at least partially form the sandwich panel to a geometry of the die;

wherein the fluid comprises an inert gas.

10. A process for manufacturing a shaped sandwich panel, comprising:

arranging a sandwich panel adjacent a die, wherein the sandwich panel includes a core layer arranged between and connected to a first layer and a second layer, the core layer includes a plurality of apertures that extend through the core layer to the first layer, and the first layer engages the die;

connecting a pressure vessel panel to the first layer to form a pressure vessel in which the core layer and the second layer are located; and pressurizing fluid within the pressure vessel and the apertures to a pressure adequate to at least partially form the sandwich panel to a geometry of the die.

11. A process for manufacturing a shaped sandwich panel, comprising:

arranging a sandwich panel adjacent a die, wherein the sandwich panel includes a core layer arranged between and connected to a first layer and a second layer, the core layer includes a plurality of apertures that extend through the core layer to the first layer, and the first layer engages the die;

directing fluid through perforations in the core layer into the apertures; and pressurizing the fluid within the apertures to a pressure adequate to at least partially form the sandwich panel to a geometry of the die.

* * * * *